July 12, 1949.   P. GRIFFIN   2,476,188
DEVICE FOR HANDLING MOWERS
Filed Sept. 19, 1945

Inventor
Paul Griffin.

By Clarence A. O'Brien
and Harvey B. Jacobson
Attorneys

Patented July 12, 1949

2,476,188

UNITED STATES PATENT OFFICE 2,476,188

DEVICE FOR HANDLING MOWERS

Paul Griffin, Clinton, Ind.

Application September 19, 1945, Serial No. 617,270

1 Claim. (Cl. 254—7)

My invention relates to agricultural implements and has for its object to provide means whereby a tractor mowing machine may be moved to and from a tractor.

Another object of my invention is to provide an attachment for wheel-less mowers whereby the same may be easily handled by one man.

A further object of my invention is to provide a wheeled hook-up for attachment to and moving wheel-less mowing machines such as those used with a tractor.

Other features and advantages will become more readily apparent from the following description and the accompanying illustrative drawings in which.

In the above drawings as well as in the specification to follow, the same characters of reference indicate the same parts throughout.

Figure 1:
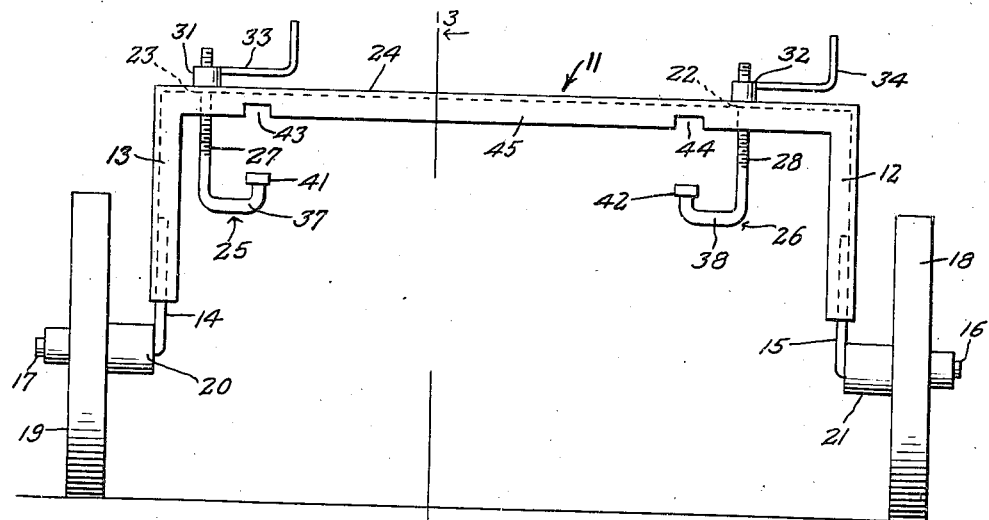
Figure 1 is an end elevation of my device.
Figure 2:
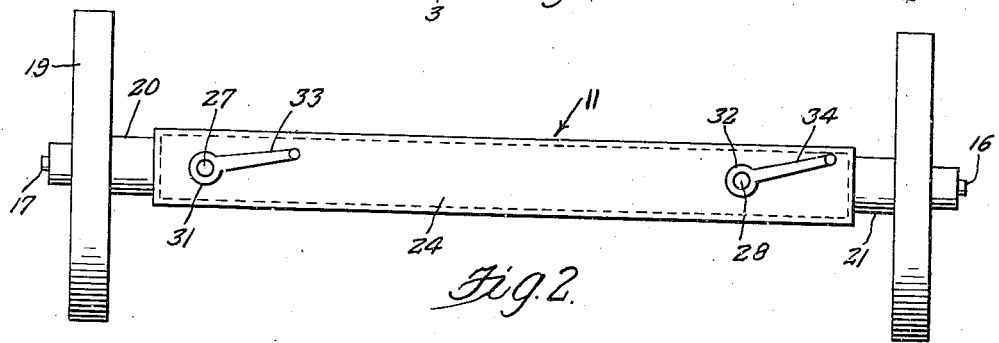
Figure 2 is a plan view thereof.
Figure 3:
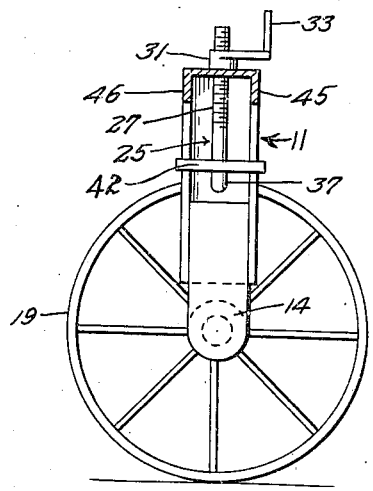
Figure 3 is a section on line 3—3 of Figure 1.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

My invention consists of an inverted U-shaped beam 11 formed of channel iron steel. Welded into the channels 12 and 13 are bars or straps 14 and 15, the lower ends of which are welded or otherwise secured at right angles to stub axles 16 and 17 upon which wheels 18 and 19 are mounted outwardly of the boxes 20 and 21 also mounted upon the said axles.

Operating through apertures 22 and 23 (shown dotted) in the head 24 of the U-member are a pair of suitably spaced lifting jacks 25 and 26 having vertical screw-threaded shanks 27 and 28, to the upper ends of which are threaded nuts 31 and 32 to which are integrally connected crank handles 33 and 34. The lower ends of the shanks 27 and 28, respectively terminate in hooks 37 and 38, the vertical upper ends of which are provided with integral cross-heads 41 and 42 adapted to seat in the locking cut-outs 43 and 44 in the flanges 45 and 46, whereby said jacks may be held against movement after receiving and lifting the load.

To operate, the device is wheeled over a mower and the jacks lowered and hooked onto certain fixed members of the mower and then again raised to the locked position, after which the free end of the mower may be lifted and the same rolled to and positioned to a tractor for connection therewith. One man can do this handily whereas without my device two or three men are required for the same job. Of course, the mower may be removed in the same manner and placed in storage.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A device of the character described comprising an inverted U-shaped channel member, depending L-shaped outwardly extending axle bars welded to the lower ends of said channel member, wheels secured to said depending axle bars, locking seats formed in the lower edges of the opposite ends of the base portion of said U-shaped channel member, threaded jack screws operably disposed through the base portion of said channel member between said locking seats and said depending side arms, nuts threaded on the ends of said jack screws above said base portion of the channel member, nut-operating crank handle formed integrally with said nuts, said jack screws being formed with laterally extending load-supporting portions and upwardly extending terminal ends, and locking cross-heads on said terminal ends adapted to be received in said locking seats in the base portion of said channel member for preventing lateral movement of said jack screws when supporting their load in elevated position.

PAUL GRIFFIN.

REFERENCES CITED

The following references are of record in the file of this patent:

UNITED STATES PATENTS

| Number | Name | Date |
|---|---|---|
| 504,377 | Titus | Sept. 5, 1893 |
| 1,340,672 | Pruismann | May 18, 1920 |
| 1,645,485 | Hardacker | Oct. 11, 1927 |